United States Patent
Jain

(10) Patent No.: US 9,143,767 B2
(45) Date of Patent: Sep. 22, 2015

(54) METHOD AND APPARATUS FOR ADAPTIVE STABLE IMAGE TIMING IN STEREOSCOPIC 3D SYSTEMS

(75) Inventor: Sunil K. Jain, Portand, OR (US)

(73) Assignee: INTEL CORPORATION, Santa Clara, CA (US)

( * ) Notice: Subject to any disclaimer, the term of this patent is extended or adjusted under 35 U.S.C. 154(b) by 805 days.

(21) Appl. No.: 12/827,454

(22) Filed: Jun. 30, 2010

(65) Prior Publication Data

US 2011/0292169 A1    Dec. 1, 2011

Related U.S. Application Data

(60) Provisional application No. 61/350,297, filed on Jun. 1, 2010.

(51) Int. Cl.
| | |
|---|---|
| H04N 13/00 | (2006.01) |
| H04N 15/00 | (2006.01) |
| H04N 13/04 | (2006.01) |
| G09G 3/00 | (2006.01) |
| G09G 5/00 | (2006.01) |

(52) U.S. Cl.
CPC ........... *H04N 13/0438* (2013.01); *G09G 3/003* (2013.01); *G09G 5/005* (2013.01); *H04N 13/0497* (2013.01); *G09G 2370/042* (2013.01); *G09G 2370/047* (2013.01); *G09G 2370/10* (2013.01); *G09G 2370/12* (2013.01); *G09G 2370/22* (2013.01); *H04N 2213/008* (2013.01)

(58) Field of Classification Search
USPC ................................................ 348/42, 43, 51
See application file for complete search history.

(56) References Cited

U.S. PATENT DOCUMENTS

| | | | |
|---|---|---|---|
| 4,772,943 A * | 9/1988 | Nakagawa et al. | 348/57 |
| 5,432,900 A | 7/1995 | Rhodes et al. | |
| 5,710,592 A | 1/1998 | Oh | |
| 7,671,856 B2 * | 3/2010 | Varaprasad et al. | 345/213 |
| 2005/0073530 A1 | 4/2005 | Kapur et al. | |
| 2008/0007655 A1 * | 1/2008 | Fujisawa et al. | 348/571 |
| 2010/0053435 A1 | 3/2010 | Goziker et al. | |
| 2010/0066820 A1 | 3/2010 | Park et al. | |
| 2010/0182402 A1 | 7/2010 | Nakajima et al. | |

(Continued)

FOREIGN PATENT DOCUMENTS

| | | |
|---|---|---|
| CN | 1822680 A | 8/2006 |
| CN | 101087398 A | 12/2007 |

(Continued)

OTHER PUBLICATIONS

International Search Report and Written opinion received for International PCT Application No. PCT/US2011/038325, mailed on Jan. 19, 2012, 8 pages.

(Continued)

*Primary Examiner* — Geepy Pe
(74) *Attorney, Agent, or Firm* — International IP Law Group, P.L.L.C.

(57) ABSTRACT

Embodiments are directed to adaptive stable image timing in stereoscopic 3D systems which may include maximizing the ratio of the Addressable Video time to a total time between two horizontal Sync pulses and minimizing the ratio of "Addressable" Video time to a total time between two Vertical Sync pulses. As the resolution size of the display decreases, the ratio minimized gets even smaller, leading to longer stable image resulting in higher 3D viewing quality.

20 Claims, 8 Drawing Sheets

(56) References Cited

U.S. PATENT DOCUMENTS

| | | |
|---|---|---|
| 2011/0267360 A1 | 11/2011 | Lee et al. |
| 2011/0320941 A1 | 12/2011 | Jain |
| 2012/0062711 A1* | 3/2012 | Ikeda et al. ............... 348/51 |

FOREIGN PATENT DOCUMENTS

| | | |
|---|---|---|
| EP | 1265210 A1 | 12/2002 |
| JP | 2001-128194 A | 5/2001 |
| JP | 2001-320733 A | 11/2001 |
| JP | 2002-334027 A | 11/2002 |
| JP | 2004-062464 A | 2/2004 |
| JP | 2004-120165 A | 4/2004 |
| JP | 2004-200784 A | 7/2004 |
| JP | 2009-025436 A | 2/2009 |
| JP | 2009-232308 A | 10/2009 |
| JP | 2011-018993 A1 | 1/2011 |
| JP | 2012-503218 A | 2/2012 |
| KR | 10-2006-0007662 A | 1/2006 |
| KR | 10-2006-0007662 A | 7/2007 |
| RU | 2 464 726 C1 | 10/2012 |
| WO | 2008025989 A2 | 3/2008 |
| WO | 2010/008012 A1 | 1/2010 |
| WO | 2010/032927 A2 | 3/2010 |
| WO | 2011/152939 A2 | 12/2011 |
| WO | 2011/153089 A2 | 12/2011 |
| WO | 2011/152939 A3 | 1/2012 |
| WO | 2011/153089 A3 | 3/2012 |

OTHER PUBLICATIONS

International Preliminary Report on Patentability and Written Opinion received for PCT Patent Application No. PCT/US2011/038325, mailed on Dec. 13, 2012, 6 pages.

Office Action received for Korean Patent Application No. 2012-7031467, mailed on Jun. 18, 2014, 5 Pages of English Translation only.

Office Action received for Korean Patent Application No. 2012-7031467, mailed on Nov. 5, 2013, 3 pages of English Translation only.

Office Action received for Japanese Patent Application No. 2013-513250, mailed on Jan. 28, 2014, 2 pages of English Translation and 2 pages of Japanese Office Action.

Office Action received for Korean Patent Application No. 2014-7003022, mailed on Apr. 8, 2014, 2 pages of English Translation only.

Notice of Allowance received for Korean Patent Application No. 10-2012-7031296, mailed on Aug. 22, 2014, 2 Pages of Notice of Allowance and 1 Page of English Translation.

Extended European Search Report received for European Patent Application No. 11790149.6, mailed on Nov. 4, 2013, 7 Pages.

Extended European Search Report received for European Patent Application No. 11790242.9, mailed on Jul. 29, 2014, 8 Pages.

Office Action received for Chinese Patent Application No. 201180026990.0, mailed on Oct. 15, 2014, 9 Pages of Office Action and 6 Pages of English Translation.

Office Action received for Chinese Patent Application No. 201180027243.9, mailed on Aug. 5, 2014, 6 Pages of Office Action and 7 Pages of English Translation.

Office Action received for Korean Patent Application No. 2012-7031296, mailed on May 1, 2014, 3 Pages of English Translation.

Office Action received for Korean Patent Application No. 2012-7031296, mailed on Oct. 24, 2013, 2 Pages of English Translation only.

Office Action received for Korean Patent Application No. 2012-7031467, mailed on Oct. 28, 2014, 2 Pages of Office Action and 3 Pages of English Translation.

Office Action received for Japanese Patent Application No. 2013-513169, mailed on Jan. 28, 2014, 3 Pages of Office Action and 3 Pages of English Translation.

Office Action received for Japanese Patent Application No. 2013-513169, mailed on Nov. 11, 2014, 2 Pages of Office Action and 3 Pages of English Translation.

Notice of Allowance received for Korean Patent Application No. 2014-7003022, mailed on Oct. 23, 2014, 2 Pages of Notice of Allowance and 1 Page of English Translation.

Fehn et al., "An evolutionary and Optimised Approach on 3D-TV", International Broadcast Conference, Amsterdam, The Netherlands, Sep. 2002, 8 Pages.

Kim et al., "The adaptatin of 3D stereoscopic video in MPEG-21 DIA" Signal Processing: Image Communication, vol. 18, No. 8, Sep. 2003, pp. 685-697.

International Preliminary Report on Patentability and Written Opinion received for PCT Patent Application No. PCT/US2011/034726, mailed on Dec. 13, 2012, 8 Pages.

International Search Report and Written Opinion for PCT Patent Application No. PCT/US2011/034726, mailed on Nov. 29, 2011, 8 Pages.

Vetro et al., "Towards a 3D Video Format for Auto-Stereoscopic Displays", SPIE Conference on Applications of Digital Image Processing XXXI, vol. 7073, Sep. 2008, 12 Pages.

* cited by examiner

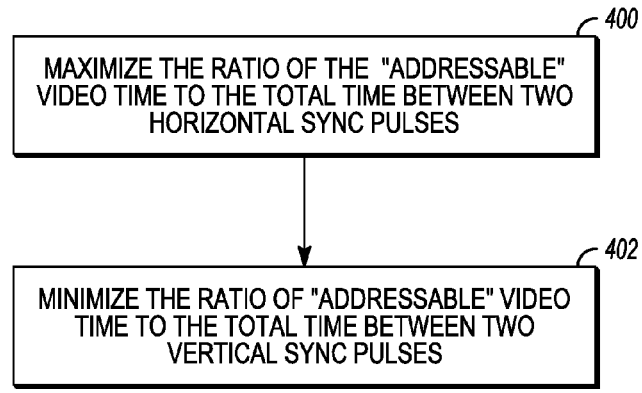

FIG. 4

| | TIMING PARAMETER | IA-SIT REQUIREMENT |
|---|---|---|
| HORIZONTAL | HORIZONTAL LEFT MARGIN | <1 CHARACTERS |
| | HORIZONTAL FRONT PORCH | <2 CHARACTERS |
| | HORIZONTAL SYNC | <8 CHARACTERS |
| | HORIZONTAL BACK PORCH | <2 CHARACTERS |
| | HORIZONTAL RIGHT MARGIN | <1 CHARACTERS |
| VERTICAL | VERTICAL TOP MARGIN | <1 LINE |
| | VERTICAL FRONT PORCH | <2 LINES |
| | VERTICAL SYNC | <8 LINES |
| | VERTICAL BACK PORCH | <2 LINES |
| | VERTICAL BOTTOM MARGIN | *ADAPTIVE PER IA-SIT* |

FIG. 5

| | | | | | | | | | | | | | |
|---|---|---|---|---|---|---|---|---|---|---|---|---|---|
| LCD DISPLAY (PRIOR ART) | EXT. VB | R→L TRANSITION | EXT. VB | L→R TRANSITION | EXT. VB | R→L TRANSITION | EXT. VB | L→R TRANSITION | EXT. VB | R→L TRANSITION | EXT. VB | L→R TRANSITION | EXT. VB |
| LCS SHUTTER GLASSES (PRIOR ART) | R ON | BOTH SHUTTERS OFF | L ON | BOTH SHUTTERS OFF | R ON | BOTH SHUTTERS OFF | L ON | BOTH SHUTTERS OFF | R ON | BOTH SHUTTERS OFF | L ON | BOTH SHUTTERS OFF | R ON |

THIS ILLUSTRATION SHOWS DOUBLE DUTY CYCLE MODE.
MULTIPLE CYCLE MODES ARE CONCEIVABLE WITH SAME PAIR OF SHUTTER GLASSES.

| | | | | | | | | | | | | | |
|---|---|---|---|---|---|---|---|---|---|---|---|---|---|
| LCD DISPLAY (NEW ART) | VB | R→L | VB | LEFT IMAGE | VB | L→R | VB | RIGHT IMAGE | VB | R→L | VB | LEFT IMAGE | VB |
| LCS SHUTTER GLASSES (NEW ART) | BOTH OFF | | BOTH OFF | LEFT SHUTTERS ON | BOTH OFF | | BOTH OFF | RIGHT SHUTTERS ON | BOTH OFF | | BOTH OFF | LEFT SHUTTERS ON | BOTH OFF |
| POWER SAVING VIA LED BACKLIGHT DUTY CYCLE | OFF | OFF | OFF | LED BACKLIGHT ON | OFF | OFF | OFF | LED BACKLIGHT ON | OFF | OFF | OFF | LED BACKLIGHT ON | OFF |

FIG. 9

METHOD AND APPARATUS FOR ADAPTIVE STABLE IMAGE TIMING IN STEREOSCOPIC 3D SYSTEMS

CROSS-REFERENCE TO RELATED APPLICATIONS

This application claims priority to U.S. Provisional Application Ser. No. 61/350,297, filed on Jun. 1, 2010, the contents of which are herein incorporated by reference.

FIELD OF THE INVENTION

Embodiments of the present invention are directed to stereoscopic systems and, more particularly, to eyewear systems useful for three-dimensional (3D) viewing.

BACKGROUND INFORMATION

Humans have what is known as binocular vision owing to the fact that we have two eyes separated by a couple of inches. Each eye views the same scene from a slightly different perspective view each providing the brain with slightly different information. These two views are combined by the brain such that we perceive depth and see the world in three-dimensions (3D).

Electronically stored or transmitted visual images, such as pictures or video, is typically displayed on a two dimensional medium such as a television screen or other type of monitor or projected on to a screen. Both eyes view the same information. The brain is thus left to use other visual cues from the two-dimensional (2D) image, such as relative sizes of objects, shadow, perspective lines, or horizons, to name a few, to sense depth. However, the picture still looks flat and not like we see the real world.

Stereoscopy refers to any of various processes and devices for giving the illusion of depth from two-dimensional images. We say illusion because true 3D may be more like a hologram where you could walk around the image and change your perspective. However, when done correctly, stereoscopy can trick the brain into thinking objects are jumping out of the screen at you.

In its simplest form, two cameras, or one camera with two lenses, spaced a few inches apart, are used to capture two 2D images. Each 2D image, of course, is from a slightly different perspective such that when the left eye views one image and the right eye views the other, the brain combines the views and we see the combined image as three-dimensional (3D).

Big screen stereoscopic motion pictures or "3D movies", as is the term more commonly used, are becoming quite popular again. In addition, 3D technologies are now available for home video with the so-called 3D TVs, video games, and streaming and recorded video content for computer monitor viewing.

There are several types of stereoscopic or "3D" technology available. Most require the viewer to wear special glasses or goggles. Some require active components in the glasses, others do not. Some require special monitors or drivers. Each has it pros and cons and, depending on the situation, may or may not make sense for a specific task.

Regardless of the technology used, the end goal is primarily to separate what the left and the right eye sees. Early technologies involved physical separation where a viewer looked into a binocular-like device, with a lens for each eye to physically separate the left and right views. This technique which may be the oldest, works quite well and a close variation of this technique is still used in modern virtual reality goggles or head-mounted displays. However, this is only good for one person or individual viewing and may be expensive or impractical for more than a couple viewers.

One of the first left/right (L/R) separation technologies good for the masses was spectral separation. The technical term is "color anaglyph" and involved each viewer wearing a pair of glasses with a red filter for one eye and a blue filter for the other. The left and right images were likewise blue or red encoded and displayed simultaneously. This technique was popular for producing 3D movies in the 1950s and even works to some degree with standard color televisions or monitors. While providing a novelty for its day, it left much to be desired aesthetically. The end result tended to be monochromatic, and had a lot of ghosting (i.e. the L/R separation was not clean). On the pro side, it was inexpensive to produce and the glasses were passive and very inexpensive.

Similar to spectral separation, the next most common technique is spatial separation and involves the viewers wearing polarized glasses, with each eye lens being polarized at 45 degrees, for example, to the other or circularly polarized in opposite directions. This is the technology used most often today in movie theaters. It works pretty well with the L/R separation being fairly complete, but usually requires two projectors or a special projector in a theatre setting or a few additional layers in a monitor which adds cost. Also, each eye only sees half resolution which may degrade the viewing experience. On the pro side, the polarized glasses are again passive and therefore relatively inexpensive.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

FIG. 4 is a flow diagram showing one embodiment of the invention for adaptive stable image timing to improve the timing of the effective stable image and an adaptive scale to mitigate the negative impact of smaller screen sizes on 3D viewing;

FIG. 5 is a table showing adaptive stable image timings for various timing parameters according to one embodiment;

FIG. 9 is a timing diagram comparing typical shutter duty cycle modes to double duty mode according to one embodiment.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As discussed above, both spectral separation and spatial separation techniques use passive glasses having various filter technologies to separate the left and right eye images. Temporal separation involves active glasses technology. Active glasses may be glasses that alternately black out the left and right eyes as the display alternately displays the left and right images.

For example, active glasses may be called shutter glasses or shutter goggles and may have liquid crystal displays (LCDs) in each eye that are caused to turn black every other frame to block, say the left eye, from seeing the right image and vice-versa for the next frame. These work well, but you get half the frames in one eye, and half the frames in the other. This can lead to headaches as your eyes try to compensate for the on/off light, low frame rates for gamers and synch problems between the display and the glasses.

Figure 1:
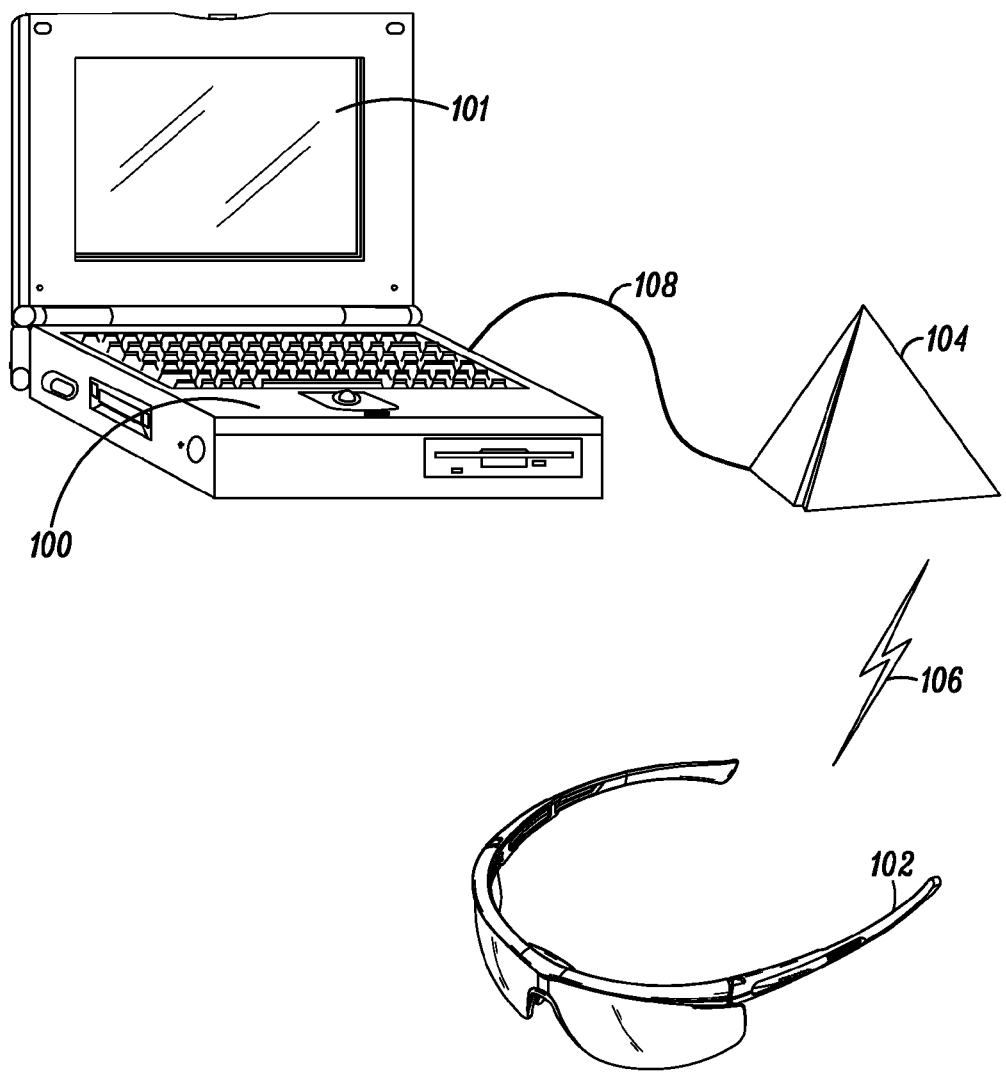
FIG. 1 is a platform, such as a laptop or other device for viewing 3D video.

FIG. 1 illustrates one system for 3D viewing using active glasses. As shown a computer 100 or other monitor has a display screen 101 for displaying 3D video content using temporal separation. The video content source may be recorded such as on CD or stored in a memory, streamed over a network, such as the internet, over the air or cable broadcasts, or any other suitable video delivery method.

Active glasses 102 typically use a transmitter 104 that is synced to the frame rate of the display 101. This transmitter 104 may use a number of wireless 106 technologies to communicate with the eyewear or glasses 102, such as infra red (IR), Radio frequency (RF), Bluethooth, etc. The transmitter 104 may be tethered to the computer 100 by a cable 108, such as a universal serial bus (USB) or USB2 cable.

In stereoscopic systems, it is desirable that eyewear shuttering be tightly coupled to the time when image is stable on the display 101. Video Electronics Standards Association (VESA) standard timings may not allow sufficient stable image time if the image is changing at each frame.

Prior solutions help a bit by allowing for the extended vertical blank timing. This may improve the image stability to a maximum period of about 32%. Further, due to small duty cycle, average perceived brightness on the display viewed through active shutter glasses is pretty low. For smaller screen size devices such as note books or netbooks, the problem of 3D viewing quality gets exacerbated.

Figure 2:
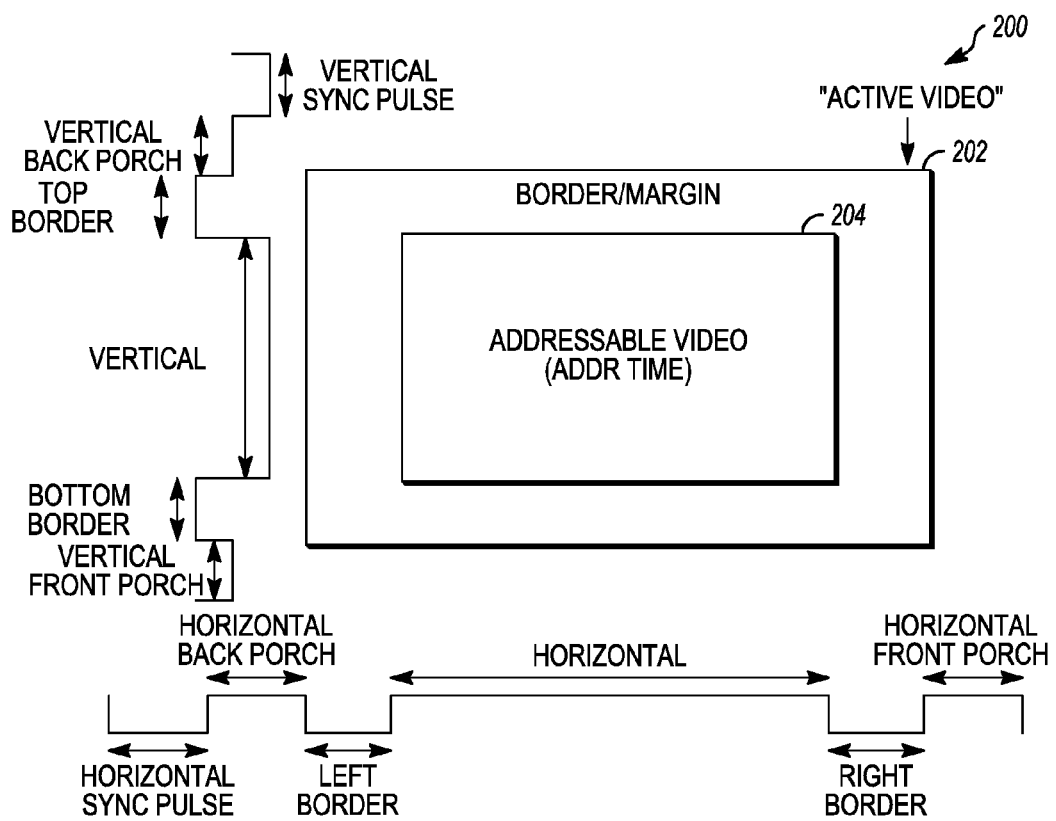
FIG. 2 is a timing diagram showing the vertical and horizontal timing parameters plotted along their respective axis along an illustration of an active video display area.
Figure 3:
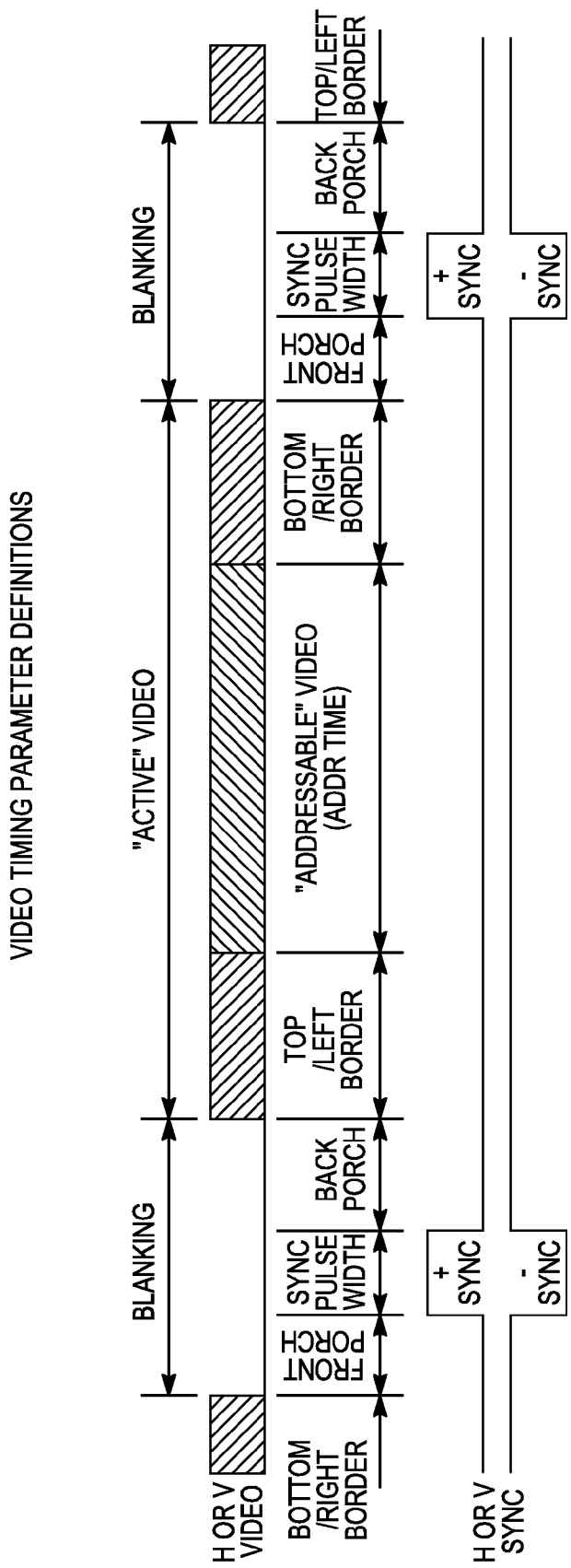
FIG. 3 is a timing diagram showing the video timing parameters, similar to FIG. 2, plotted along the same time axis.

FIGS. 2 and 3 both illustrate video timing parameters. FIG. 2 shows the active video are 200 comprising a border or margin 202 and addressable video area (Addr Time) 204 with the vertical timing parameters fashioned along the vertical axis if the active video 200 and the horizontal timing parameters fashioned along the horizontal axis of the active video 200 for ease of illustration. FIG. 3 is similar to FIG. 2 but that it shows essentially the vertical and horizontal video timing parameter along the same axis as they may occur in real time.

The video timing parameters of either FIG. 2 or FIG. 3 may be defined as follows:

Horizontal Addressable Video is the time between the end of the Left Border and the beginning of the Right Border.

Horizontal Blanking is the time between the end of the Right Border and the beginning of the Left.

A Border includes the Horizontal Front Porch time, the Horizontal Sync Pulse Width time and the Horizontal Back Porch time.

Horizontal Front Porch is the time between the end of the Right Border and the beginning of the Horizontal Sync Pulse.

Horizontal Left Border is the time between the end of the Horizontal Blanking period and the beginning of the Horizontal Addressable Video region.

Horizontal Right Border is the time between the end of the Horizontal Addressable Video region and the beginning of the Horizontal Blanking period.

Horizontal Sync Pulse Width is the time between the end of the Horizontal Front Porch and the beginning of the Horizontal Back Porch.

Horizontal Back Porch is the time between the end of the Horizontal Sync Pulse and the beginning of the Left Border.

Horizontal Active Video is the sum of the Horizontal Left Border time, the Horizontal Addressable Video time and the Horizontal Right Border time.

Vertical Addressable Video is the time between the end of the Top Border and the beginning of the Bottom Border.

Vertical Blanking is the time between the end of the Bottom Border and the beginning of the Top Border and may include the Vertical Front Porch time, the Vertical Sync Pulse Width time and the Vertical Back Porch time.

Vertical Front Porch is the time between the end of the Bottom Border and the beginning of the Vertical Sync Pulse.

Vertical Top Border is the time between the end of the Vertical Blanking period and the beginning of the Vertical Addressable Video region.

Vertical Bottom Border is the time between the end of the Vertical Addressable Video region and the beginning of the Vertical Blanking period.

Vertical Sync Pulse Width is the time between the end of the Vertical Front Porch and the beginning of the Vertical Back Porch.

Vertical Back Porch is the time between the end of the Vertical Sync Pulse and the beginning of the Top Border.

Vertical Active Video is the sum of the Vertical Top Border time, the Vertical Addressable Video time and the Vertical Bottom Border time.

Embodiments of the present invention are directed to Adaptive Stable Image Timing (A-SIT) and provides an elegant and innovative methodology to not only improve the timing of the effective stable image (and thereby enhance the quality of the 3D viewing significantly) but also an adaptive scalable way of reversing the negative impact of smaller screen sizes on 3D viewing.

For personal 3D devices such as client PCs that have relatively smaller screen sizes and relatively lower resolutions than typical 3D TVs, this invention may be very advantageous. The improved stable timing also opens added opportunities to save power.

A-SIT comprises a methodology that works through a specific timing combination established amongst the ingredients of a typical stereoscopic 3D (S3D) viewing system which may include a display driver chip (e.g. a graphics processing unit (GPU)), panel/display, emitter control logic (on motherboard or in the panel or in a peripheral), and the Eyewear/Active shutter glasses.

Referring now to FIG. 4 there is shown a flow diagram of one embodiment of the present invention. In box 400 the inventive method maximizes the ratio of the "Addressable" Video time (as graphically illustrated in FIG. 3) to the total time between two horizontal Sync pulses. In box 402 the method then minimizes the ratio of "Addressable" Video time to the total time between two Vertical Sync pulses.

For typical Vertical sync frequency (say 120 Hz), as the resolution (size) of the display decreases, the ratio minimized by step 402 gets even smaller, leading to longer stable image resulting in higher 3D viewing quality.

Figure 6:
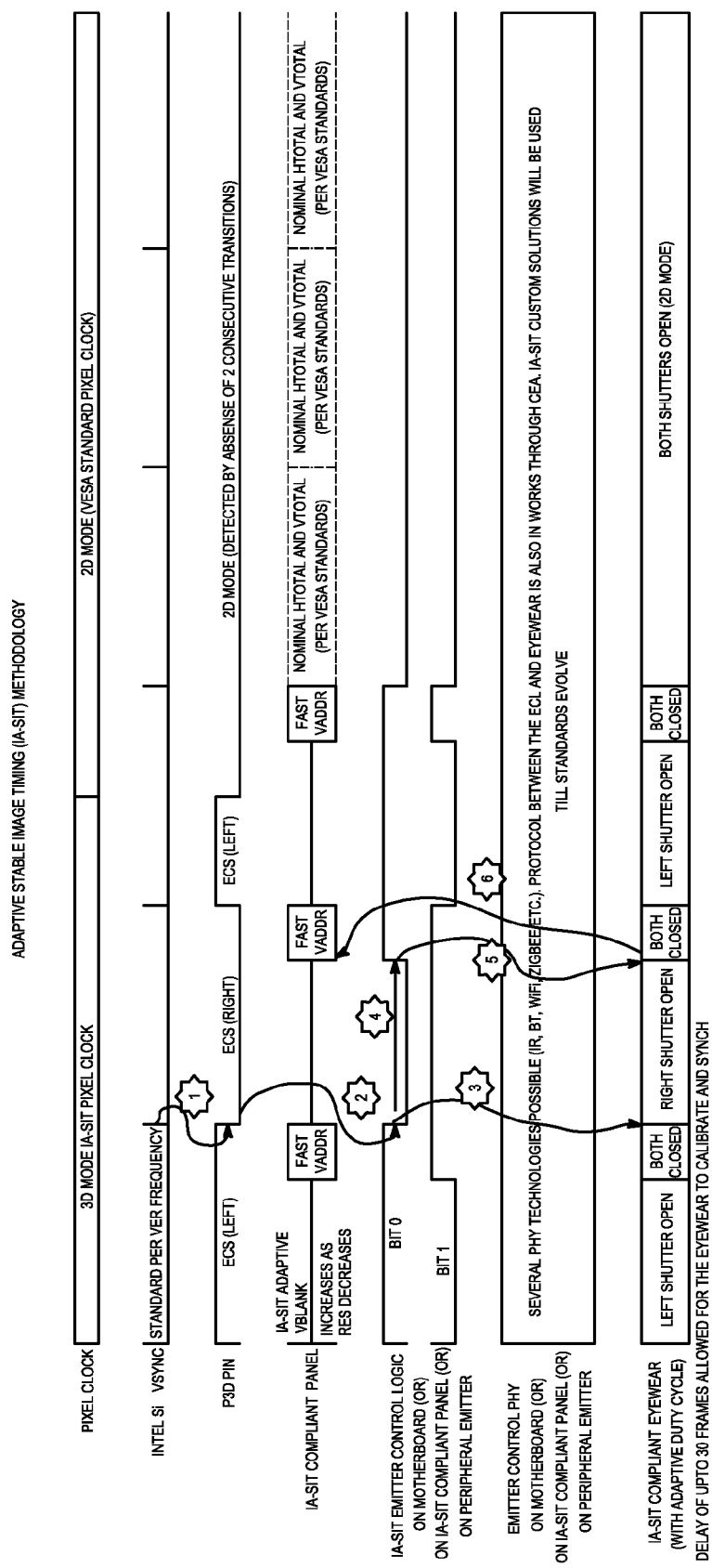
FIG. 6 are timing diagrams setting forth adaptive stable image timing according to one embodiment.

FIG. 5 shows a look-up table, and FIG. 6 shows a timing diagram, detailing the Adaptive Stable Image Timing (A-SIT) for each timing parameter. The horizontal timing parameters are given in characters (pixels) and the vertical timing parameters given in lines. The look-up table may be maintained, for example, in a graphics driver that allocates the A-SIT margins to the panel or monitor. The eyewear is maintained in synch with the help of Emitter Control (ECS) Signaling generated by the display driver GPU and an Emitter Control Logic that resides either on the system motherboard, or in the panel, or in a peripheral. ECL can also be conceived of integrated into the display driver GPU itself implemented either in software or in hardware or both.

A-SIT makes use of the ratios of addressed and non-addressed horizontal and vertical timings, thereby removing the barrier on upper or lower limits of duty cycle. Effective stable image timing thus increases with faster pixel clocks, and also as the screen size resolution decreases. Additional Power saving opportunities per unit visual quality that arise out of A-SIT methodology.

Referring again to FIG. 1, stereoscopic viewing may require eyewear 102 shuttering to be synchronized to the left/right frame transitions on the screen 101. Vendor specific optimizations may be done to achieve good viewing quality. Commonly available stereoscopic systems (such as PCs, 3DTVs, projectors, gaming machines, etc) may be offered with a special peripheral called emitter 104 (aka blaster, transmitter) that is typically tethered via a USB2 (example in FIG. 1) or VESA 3 pin-DIN 108. Infrared, Blue Tooth, Zigbee, WiFi, or any other RF wireless mechanisms 106 may also be proposed as means to communicate between the peripheral transmitter 104 and the eyewear receivers 102.

A problem is that while this additional peripheral adds to the system cost for the end user and piles on more electronic waste on the planet, it also adds design, manufacturing, validation, sales and support challenges for the suppliers as well as makes for a more cluttered viewing space.

In yet another embodiment, the present invention eliminates the peripheral transmitter 104 along with its tether 108 of FIG. 1. A programmable pulse generator 700 and signaling mechanism may be integrated within the Central Processing Unit/Graphics Processing Unit (CPU/GPU) Silicon. A graphics driver extension may be programmed to generate signaling output which may be in-band or out-of-band with the display interface (such as HDMI, embedded display port (eDP), DP), and may also be through a special purpose pin on the silicon. Some discrete components and firmware may be used on the motherboard/display for signaling level and media translation corresponding firmware on the receiver side (i.e. the shutter glasses 102).

Figure 7:
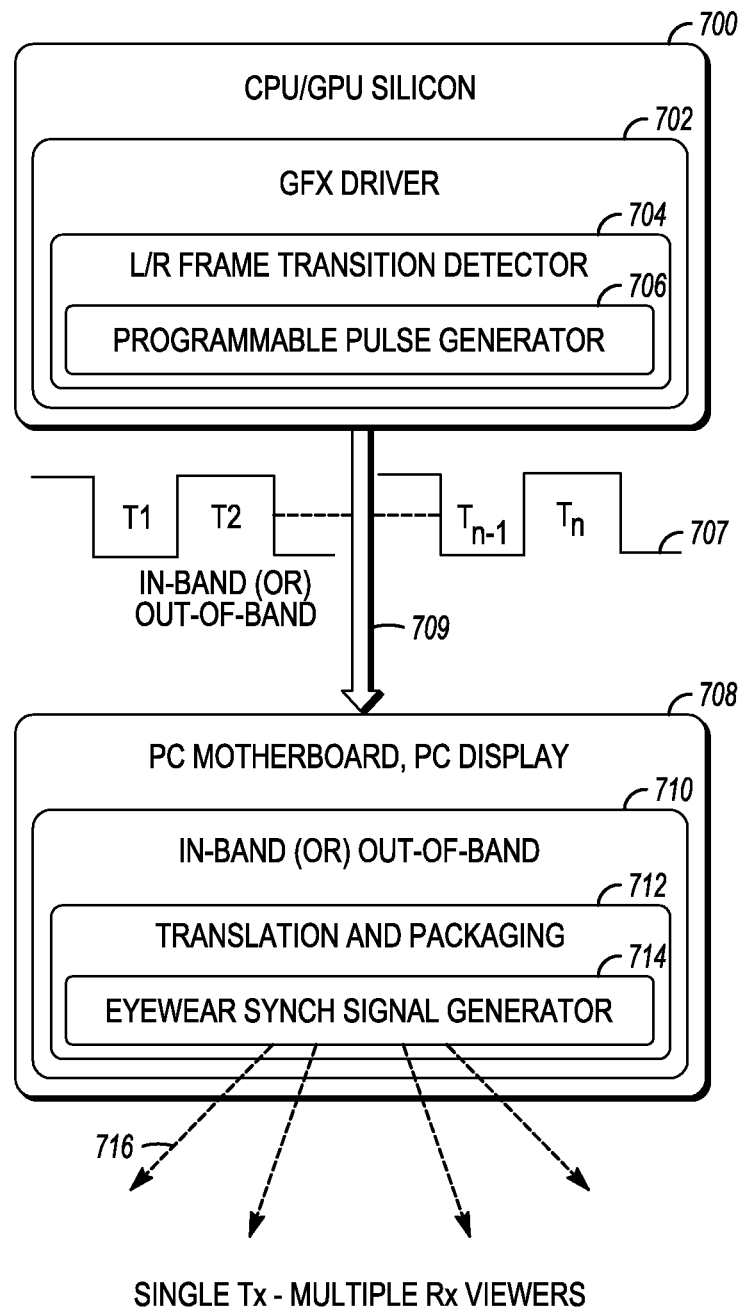
FIG. 7 is a block diagram showing elimination for the peripheral wireless transmitter for controlling shutter glasses by integration of those functions into the silicon.

This invention makes more effective use of the silicon and drivers in a typical PC and removes the redundant effort incurred to support the conventional approaches. Referring now to FIG. 7, the central processing unit (CPU) or graphics processing unit (GPU) 700 may be fabricate on a silicon chip. In addition to the typical components normally found in a CPU/GPU, a graphics driver (Gfx) 702 may also be integrated. The graphics driver 702 may include a L/R frame transition detector 704 for detecting Left/Right frame transitions in a stereoscopic video presentation. A programmable pulse generator 706 may also be included to generate a L/R frame transition signal 706. The L/R frame transition signal 707 may be in-band or out-of-band with a display signal sent to the display monitor.

The CPU/GPU 700 may be used in a variety of computing devices capable of displaying 3D video. In one embodiment, the CPU/GPU 700 may connect to a PC motherboard 708 such as by a dedicated pin 709 on the CPU/GPU 700. The motherboard may also include PC display drivers for driving a display. Circuitry or firmware 710 on the motherboard 708 may receive the in-band or out-of band signal and translate and package 712 them for an eyewear sync signal generator 714. The eyewear sync signal generator 714 may output signals 716 which may be received by one or more active glasses (102 from FIG. 1). Most PCs or computing devices have IR, RF, Bluetooth or other wireless capabilities that the eyewear sync signal generator 714 may utilize to transmit to the glasses 102.

In yet another embodiment stereoscopic viewing involves eyewear shuttering to be synchronized to the left/right frame transitions. Left eye shutter opens when the left frame image is stable on the display (e.g. LCD) and right eye shutter opens when the Right frame image is stable on the LCD. Because LCD displays are typically progressive scan type, the stable image occurs only for the duration of vertical blank. In one approach, the stereoscopic 3D system vendors extend the vertical blank timing to elongate the stable image timing. Publications and commercial products can be found in support of this approach.

Figure 8:
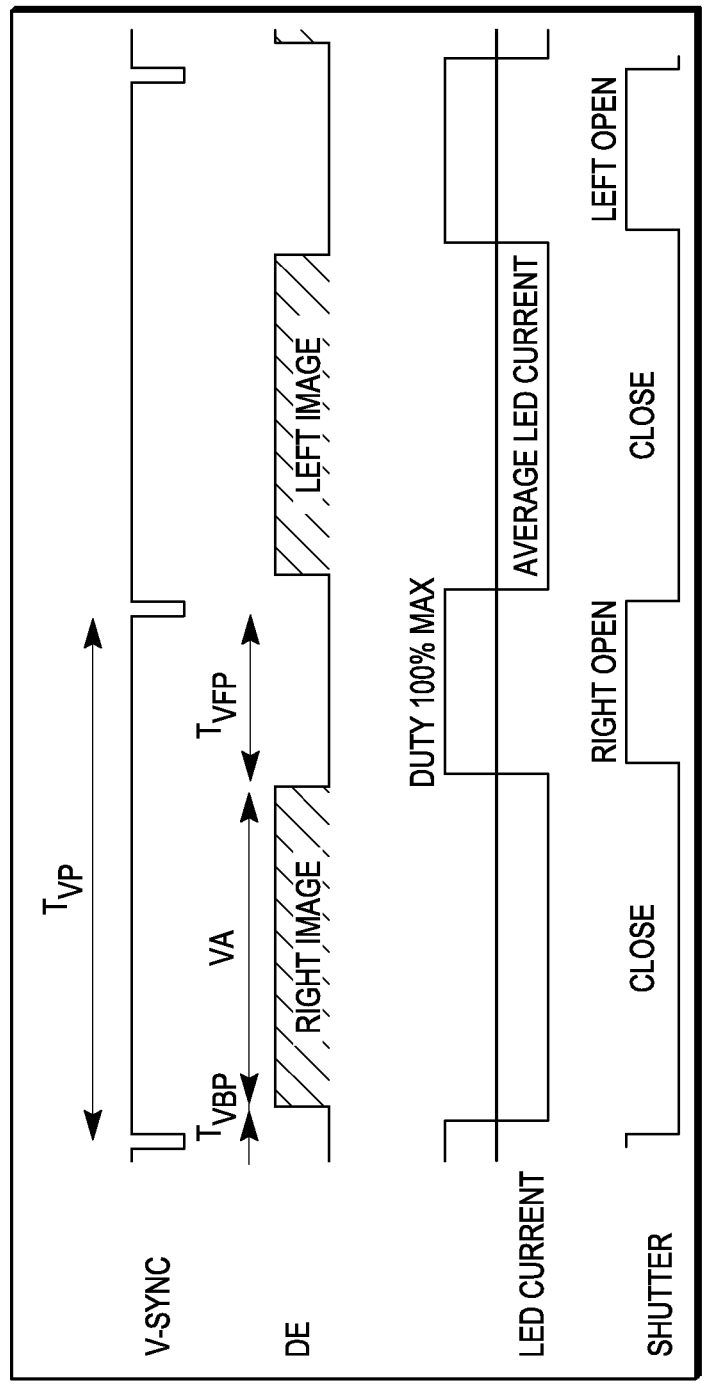
FIG. 8 is a timing diagram showing LED current to shutter opening and closing.

Because shutter glasses open only during the vertical blank (or extended vertical blank) period that is a relatively smaller portion of the overall refresh as illustrated, for example in FIG. 8.

This may lead to multiple problems, including low perceived brightness due to small duty cycle, added cost and complexity in display timing controller and glasses synching mechanisms due to the need of precisely synchronizing the shuttering of eyewear glasses to the extended vertical blank timing, and difficulty in scalability and reuse of glasses with changing display types.

One method improves the perceived brightness by increasing the power of the display backlight either via a higher number of LEDs or by harder driving or with brighter LEDs or combinations of these techniques. This of course adds cost by increasing the number of LEDs as well as the extra energy consumed by harder driving.

Another known method of improving perceived brightness involves extension of vertical blank timing. That is, a faster rate such as 144 Hz is used instead of 120 Hz so that frames can transition faster, and the saved time is added to the normal vertical blank. Custom eyewear shutters are precisely synchronized to this new extended vertical blank timing implemented on a custom display.

Yet another approach is faster refresh rate display that effectively increases the duty cycle of shutters opening, thereby improving the perceived brightness, albeit at the cost of power and faster response time crystal shutters.

Yet another techniques in this space such as back light blinking, black frame insertion, and black line insertion etc. are useful in improving the contrast ratio and motion blur mitigation, or saving backlight power, but not in improving the perceived brightness in stereoscopic 3D viewing usage models.

Embodiments of this invention involve a novel approach to solve several problems through one system design solution. Multiple duty cycle refresh mode leads to longer stable brighter image periods, simplified timing architecture reduces the cost and complexity in the eyewear glasses, opportunities to save system power through back light blinking, and architecture is scalable making the reuse of eyewear glasses possible from one generation to the next, and across all Intel systems using this approach.

The invention is a multiple duty cycle refresh mode driver and display. This invention results into longer stable brighter images leading to improved 3D viewing quality. Three main components of this invention may include a graphics driver (such as 702 illustrated in FIG. 7) implementation with a corresponding timing specification for a compliant display device, a panel having refresh timing meeting the specific requirements ascribed in this invention to drive a LCD display and its backlights, and eyewear 102 comprising liquid crystal shutter glass eyewear that can synchronize to the timing proposed in this invention.

Referring now to FIG. 9, this invention takes a novel system design approach to accomplish elongated stable image periods during which the eyewear shutters can remain open. The invention uses the classic liquid crystals in the eyewear (such as suitable for conventional 60 Hz per eye switching) instead of the ones requiring precise synchronization with extended vertical blanks. The invention also uses the classic graphics drivers but specifies a special multiple refresh mode that can be implemented as software extension. On the LCD display side, the invention builds on the classic faster refresh rate displays, and asks for a change in the display timing control electronics to rewrite two consecutive frames. All these improvements result into a longer stable brighter 3D image as viewed by the user.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   maximizing a ratio of the Addressable Video time to a total time between two horizontal Sync pulses for a given display size; and
   minimizing the ratio of Addressable Video time to a total time between two Vertical Sync pulses for the given display size.

2. The method as recited in claim 1 wherein the horizontal sync pulse comprises a plurality of associated timing parameters comprising:
   a horizontal left margin, a horizontal front porch, a horizontal sync, a horizontal back porch, and a horizontal right margin.

3. The method as recited in claim 1 wherein the vertical sync pulse comprises a plurality of associated timing parameters comprising:
   a vertical top margin, a vertical front porch, a vertical sync, a vertical back porch, and a vertical bottom margin.

4. The method as recited in claim 2 wherein the horizontal left margin comprises less than one character.

5. The method as recited in claim 2 wherein the horizontal front porch comprises less than two characters.

6. The method as recited in claim in claim 2 wherein the horizontal sync comprises less than eight characters.

7. The method as recited in claim 2 wherein the horizontal back porch comprises less than two characters.

8. The method as recited in claim 2 wherein the horizontal right margin comprises less than one character.

9. The method as recited in claim 3 wherein the vertical top margin comprises less than one line.

10. The method as recited in claim 3 wherein the vertical front porch comprises less than two lines.

11. The method as recited in claim 3 wherein the vertical sync comprises less than eight lines.

12. The method as recited in claim 3 wherein the vertical back porch comprises less than two lines.

13. The method as recited in claim 3 wherein the vertical bottom margin is variable.

14. An apparatus, comprising:
   a processing unit fabricated on a semiconductor chip;
   a graphics driver fabricated on the semiconductor chip;
   a left/right frame transition detector in the graphics driver for detecting left/right frame transitions in a stereoscopic video presentation; and
   a programmable pulse generator on the semiconductor chip to generate a left/right frame transition signal wherein the processing unit is configured to:
      maximize a ratio of the Addressable Video time to a total time between two horizontal Sync pulses for a given display size; and
      minimize the ratio of Addressable Video time to a total time between two Vertical Sync pulses for the given display size.

15. The apparatus as recited in claim 14 wherein the left/right frame transition signal is in-band.

16. The apparatus as recited in claim 14 wherein the left/right frame transition signal is out-of-band.

17. The apparatus as recited in claim 14 further comprising:
   a motherboard;
   a dedicated pin in the mother board for receiving the left/right frame transition signal.

18. The apparatus as recited in claim 17 further comprising an eye wear sync signal generator to generate an output signal to one or more active glasses to synchronize the active glasses to the stereoscopic video presentation on a display.

19. The apparatus as recited in claim 18, wherein the motherboard is contained in a computing device that includes wireless capabilities for transmitting the eye wear sync signal to the one or more active glasses.

20. The apparatus as recited in claim 19 wherein the wireless capabilities comprise at least one of infra-red (IR), radio frequency (RF), and Bluetooth.

* * * * *